United States Patent
Groninga et al.

(10) Patent No.: US 11,993,360 B2
(45) Date of Patent: May 28, 2024

(54) ENERGY ATTENUATING POD CARRIER SYSTEM FOR VERTICAL LIFT AIRCRAFT

(71) Applicant: Bell Textron Inc., Fort Worth, TX (US)

(72) Inventors: Kirk Landon Groninga, Keller, TX (US); Daniel Bryan Robertson, Southlake, TX (US); Matthew Edward Louis, Fort Worth, TX (US); Paul Charles Griffiths, Roanoke, TX (US)

(73) Assignee: Textron Innovations Inc., Providence, RI (US)

( * ) Notice: Subject to any disclaimer, the term of this patent is extended or adjusted under 35 U.S.C. 154(b) by 100 days.

(21) Appl. No.: 17/094,180

(22) Filed: Nov. 10, 2020

(65) Prior Publication Data

US 2022/0144406 A1    May 12, 2022

(51) Int. Cl.
| | |
|---|---|
| *B64C 1/06* | (2006.01) |
| *B64D 9/00* | (2006.01) |
| *B64D 25/00* | (2006.01) |
| *B64F 5/10* | (2017.01) |
| *B64C 29/00* | (2006.01) |

(52) U.S. Cl.
CPC ............. *B64C 1/062* (2013.01); *B64D 9/00* (2013.01); *B64F 5/10* (2017.01); *B64C 29/0016* (2013.01); *B64D 25/00* (2013.01)

(58) Field of Classification Search
CPC .. B64C 1/062; B64C 1/08; B64C 1/14; B64C 29/0091; B64C 27/006; B64D 25/00; B62D 21/15
See application file for complete search history.

(56) References Cited

U.S. PATENT DOCUMENTS

| | | | | |
|---|---|---|---|---|
| 3,176,940 A | * | 4/1965 | Echeverria, Jr. .......... | B64C 1/00 244/137.4 |
| 3,335,982 A | * | 8/1967 | Stahl ........................ | F16F 7/12 244/122 AC |
| 3,377,037 A | * | 4/1968 | Stewart .................. | B64D 25/12 244/140 |
| 4,267,987 A | * | 5/1981 | McDonnell ............ | B64D 39/00 244/6 |
| 4,593,870 A | * | 6/1986 | Cronkhite ................. | F16F 7/12 244/119 |
| 4,895,321 A | * | 1/1990 | Huhn ....................... | B64C 1/22 244/120 |
| 7,946,530 B1 | * | 5/2011 | Talmage, Jr. ........... | B64C 39/02 244/140 |
| 2011/0227376 A1 | * | 9/2011 | Franck ................. | B60N 2/2821 297/216.11 |

* cited by examiner

*Primary Examiner* — Joshua J Michener
*Assistant Examiner* — Ka Chun Leung
(74) *Attorney, Agent, or Firm* — Lightfoot & Alford PLLC

(57) ABSTRACT

A vehicle has a pod carrier, a pod rotatably connected to the pod carrier, and an energy attenuating system (EAS) disposed between the pod and the pod carrier to attenuate forces associated with a deflection of the pod relative to the pod carrier. A method of operating an energy attenuating system (EAS) is provided for attenuating energy associated with movement between a pod and a pod carrier. The method includes providing a vehicle having a pod carrier and providing the pod carrier with an EAS configured in an undeflected state.

9 Claims, 13 Drawing Sheets

ENERGY ATTENUATING POD CARRIER SYSTEM FOR VERTICAL LIFT AIRCRAFT

BACKGROUND

This disclosure relates generally to absorption of impact energy when a vertical lift or vertical takeoff and landing (VTOL) aircraft experiences a hard landing. Some aircraft comprise energy absorption systems integrated into seats of the aircraft to protect people riding within the aircraft. However, the conventional systems and methods of absorbing impact energy are specific to individual seats.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, the use of the term "coupled" throughout this disclosure may mean directly or indirectly connected, moreover, "coupled" may also mean permanently or removably connected, unless otherwise stated.

Figure 1:
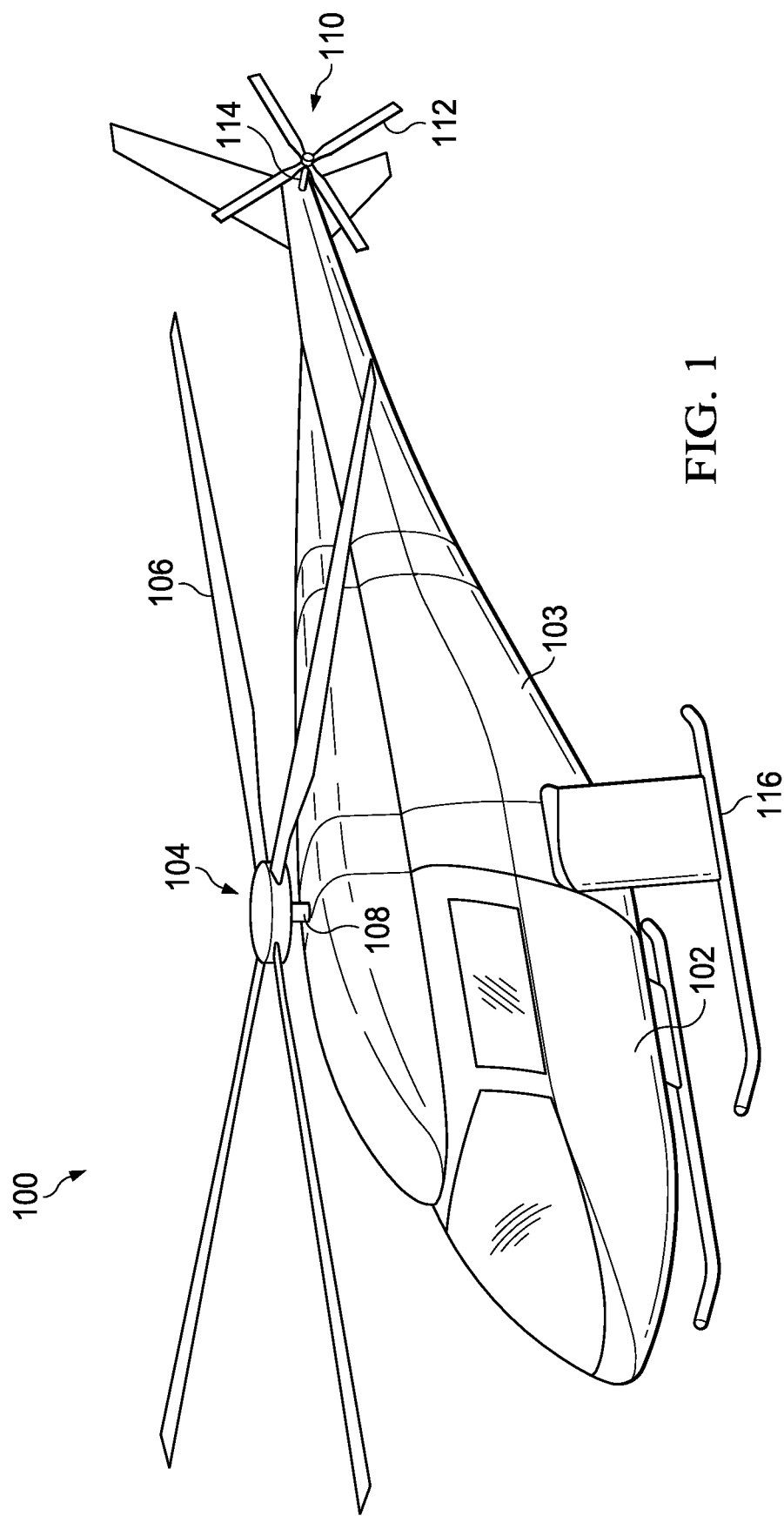
FIG. 1 is a side view of a pod carrying vertical takeoff and landing (VTOL) aircraft including an energy attenuating system (EAS) in an undeflected state according to an embodiment of this disclosure.
Figure 2:
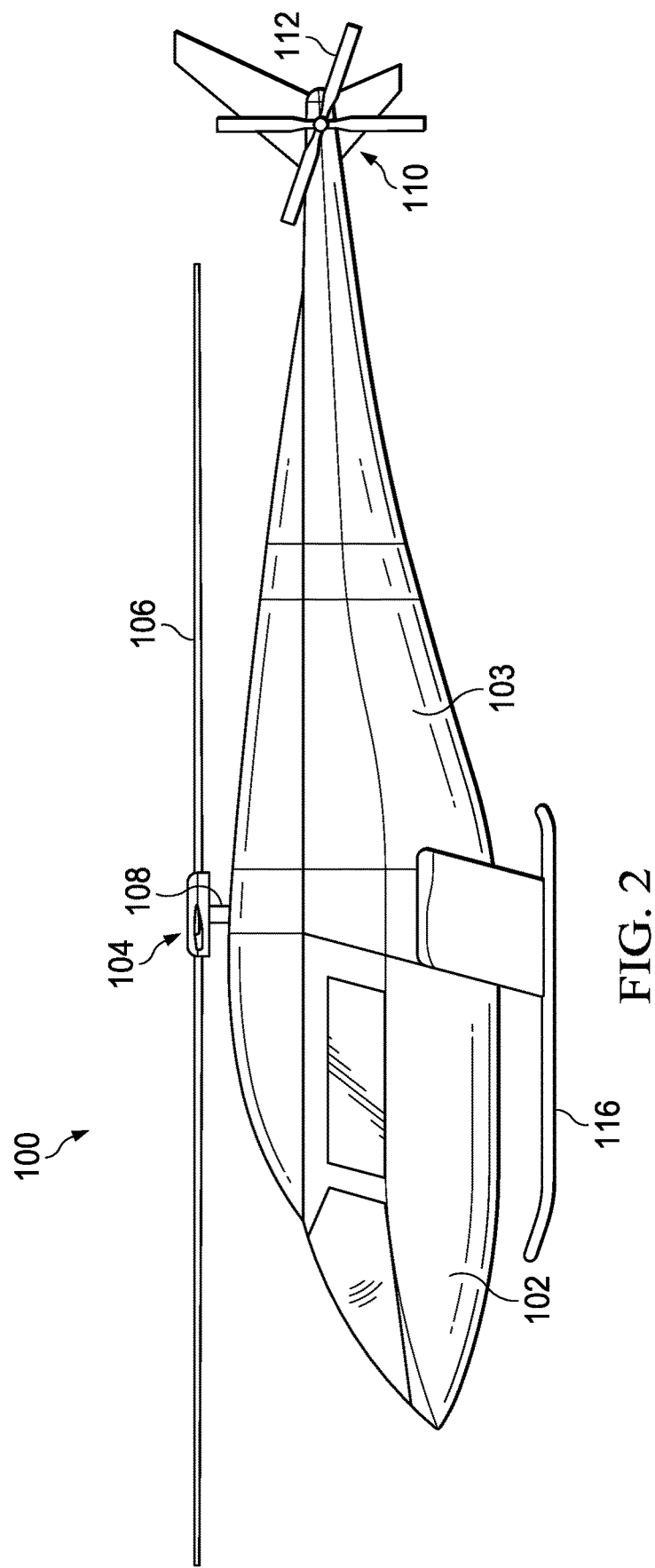
FIG. 2 is an oblique view of the aircraft of FIG. 1.

Referring now to FIGS. 1 and 2 in the drawings, a vertical takeoff and landing (VTOL) aircraft 100 according to the present disclosure is illustrated. Aircraft 100 comprises pod carrier 103 and a main rotor assembly 104 including main rotor blades 106 and a main rotor shaft 108. Aircraft 100 comprises a tail rotor assembly 110 including tail rotor blades 112 and a tail rotor shaft 114. Main rotor blades 106 generally rotate about a vertical axis of main rotor shaft 108. Tail rotor blades 112 generally rotate about a lateral axis of tail rotor shaft 114. Aircraft 100 is generally configured to selectively carry a detachable pod 102. Detachable pod 102 can be configured to carry human passengers and/or cargo. Aircraft 100 further comprises an energy attenuation system (EAS) 200 according to the present disclosure for attenuating impact forces when the aircraft 100 makes a hard landing. In particular, EAS 200 is activated when pod 102 is impacted from below in a manner that generally urges pod 102 toward main rotor system 104. In some cases, landing gear 116 can first be at least partially deflected prior to the above described impact imparted to pod 102.

Figure 3:
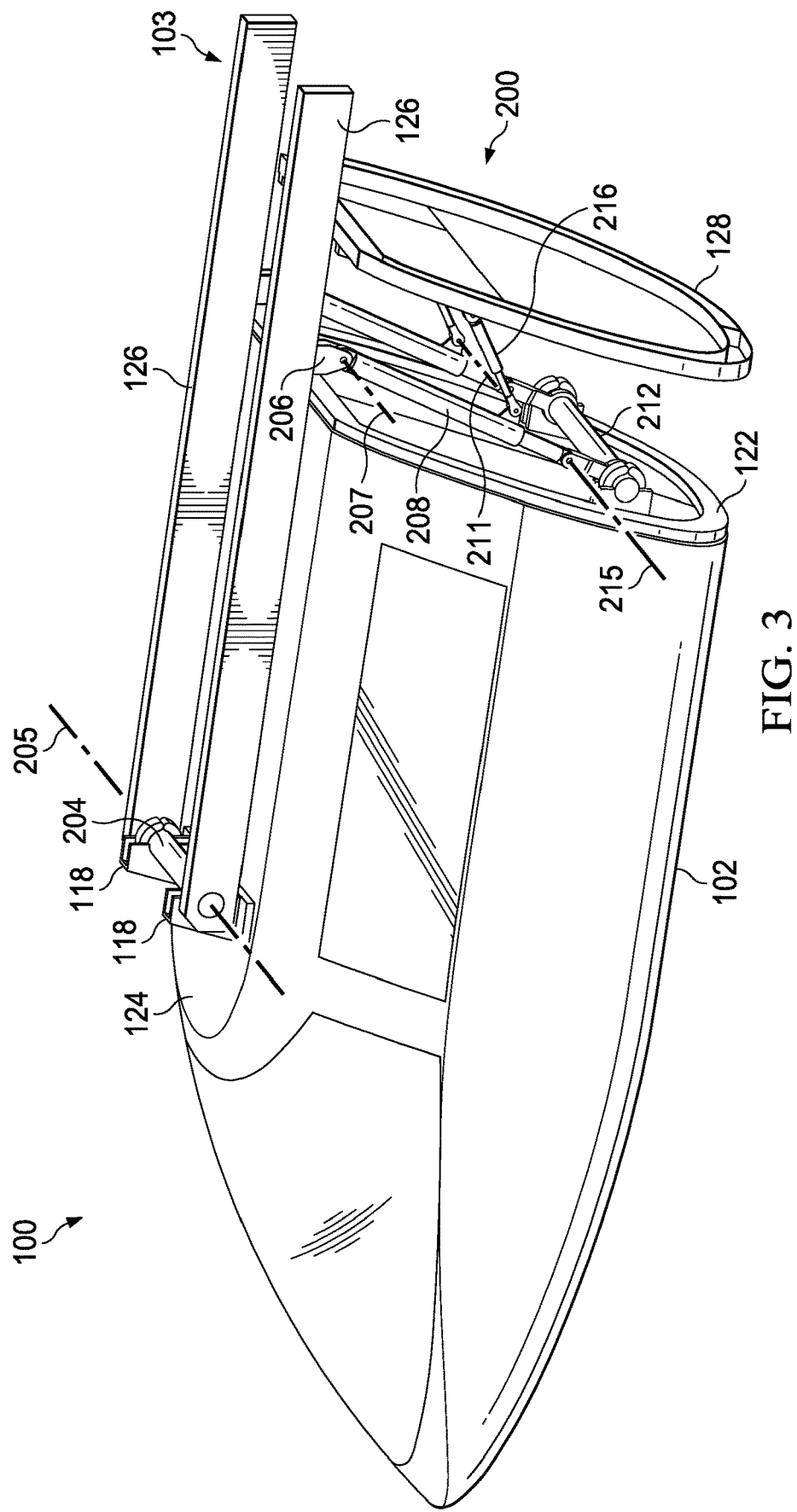
FIG. 3 is an oblique view of a portion of the aircraft of FIG. 1 showing the EAS in greater detail.
Figure 4:
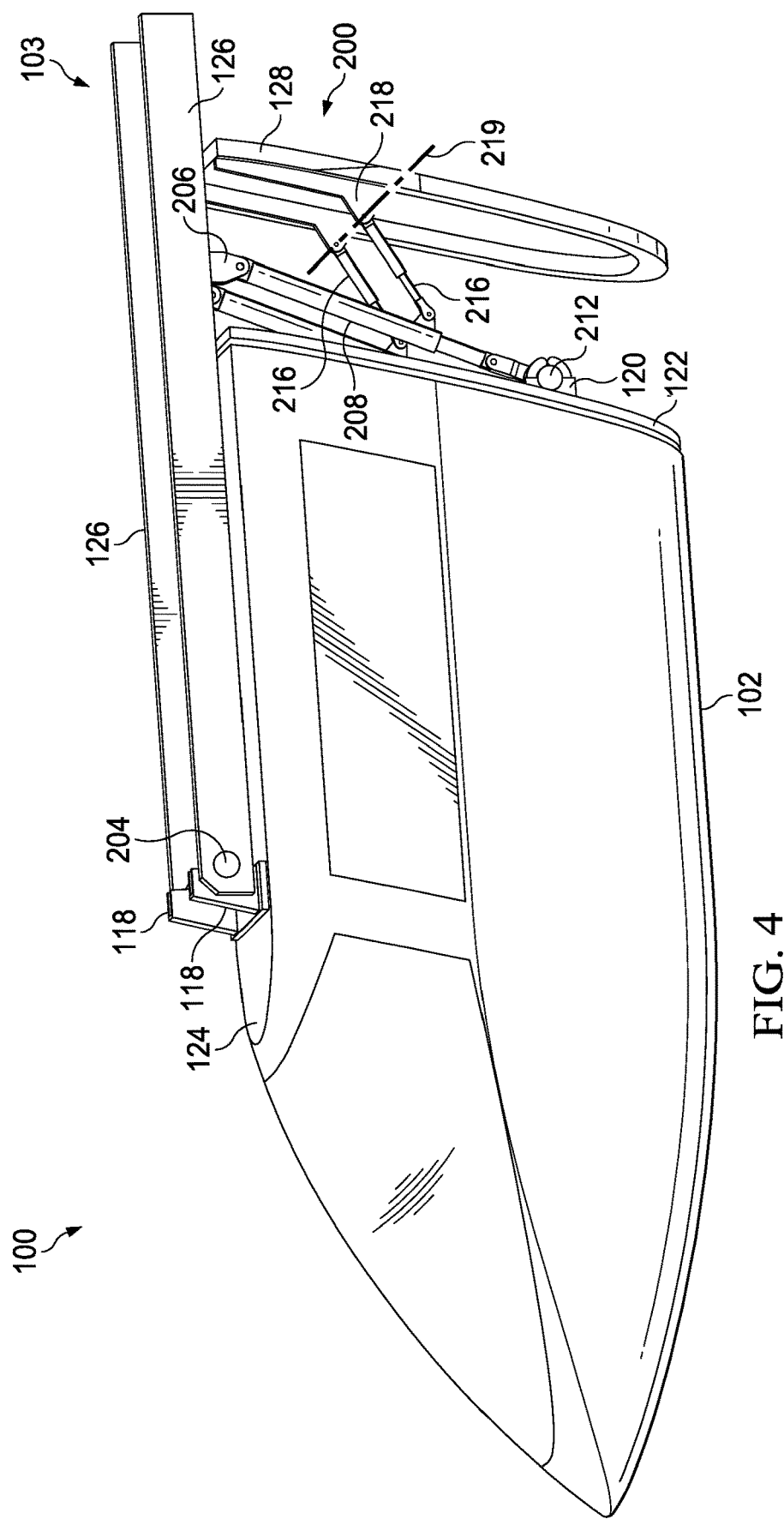
FIG. 4 is another oblique view of a portion of the aircraft of FIG. 1 showing the EAS in greater detail.
Figure 5:
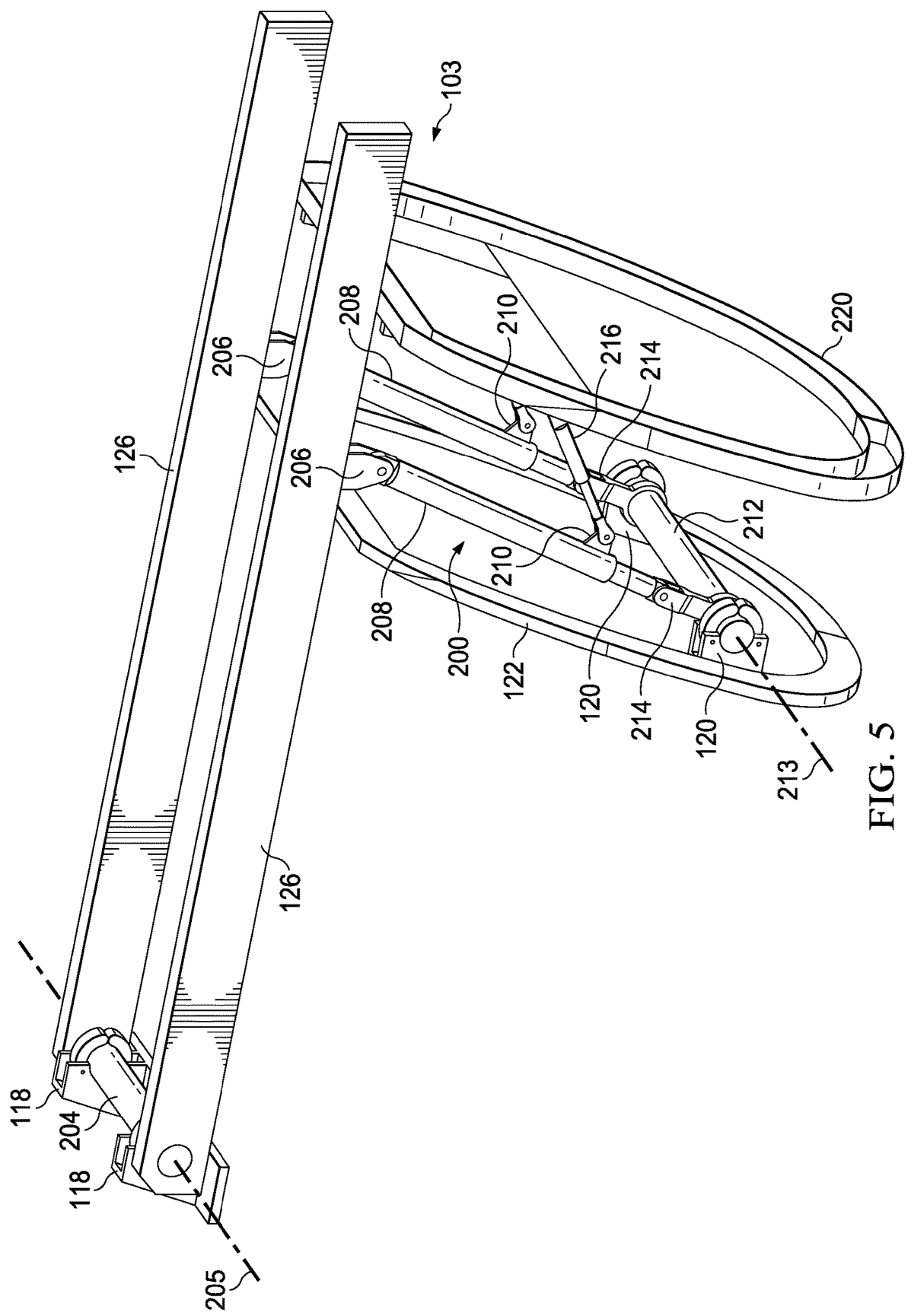
FIG. 5 is an oblique view of the EAS of the aircraft of FIG. 1 showing the EAS in isolation.

Referring now to FIGS. 3 and 4, pod 102 is shown as further comprising upper clamps 118 and lower clamps 120. Upper and lower clamps 118, 120 can be provided as biased toward a closed state so that although they can be selectively opened, once closed they can be biased closed and/or locked. In this embodiment, lower clamps 120 are connected to a rear structural rib 122 of pod 102 while upper clamps 118 are connected to a structural top 124 of pod 102. Still referring to FIGS. 3 and 4, pod carrier 103 is shown as further comprising two laterally offset upper beams 126 and a forward structural rib 128. Generally, upper beams 126 and rib 128 are fixed relative to each other.

Now referring to FIGS. 3-6, EAS 200 is shown in an undeflected state. In the undeflected state, pod 102 is not deflected relative to a remainder of aircraft 100 or pod carrier 103 and is in a desired flight state. EAS 200 generally comprises an upper rotation bar 204 extending between upper beams 126, lower mounts 206 connected to upper beams 126 and configured to interface with energy attenuating struts 208 in a manner that allows rotation of energy attenuating struts 208 about an axis of rotation 207. Each energy attenuating strut 208 comprises a rear mount 210 configured to interface with stabilizing struts 216 in a manner that allows rotation of stabilizing struts 216 about an axis of rotation 211. EAS 200 further comprises a lower rotation bar 212 comprising upper mounts 214 configured to interface with energy attenuating struts 208 in a manner that allows rotation of energy attenuating struts 208 about an axis of rotation 215. In this embodiment, stabilizing struts 216 are additionally connected to forward mounts 218 that are carried by forward structural rib 128 of pod carrier 103. In this embodiment, upper clamps 118 are configured for selective attachment to upper rotation bar 204 in a manner that captures upper rotation bar 204 and allows rotation of upper clamps 118 about axis of rotation 205. Similarly, in this embodiment, lower clamps 120 are configured for selective attachment to lower rotation bar 212 in a manner that captures lower rotation bar 212 and allows rotation of lower clamps 120 about axis of rotation 213.

Figure 6:
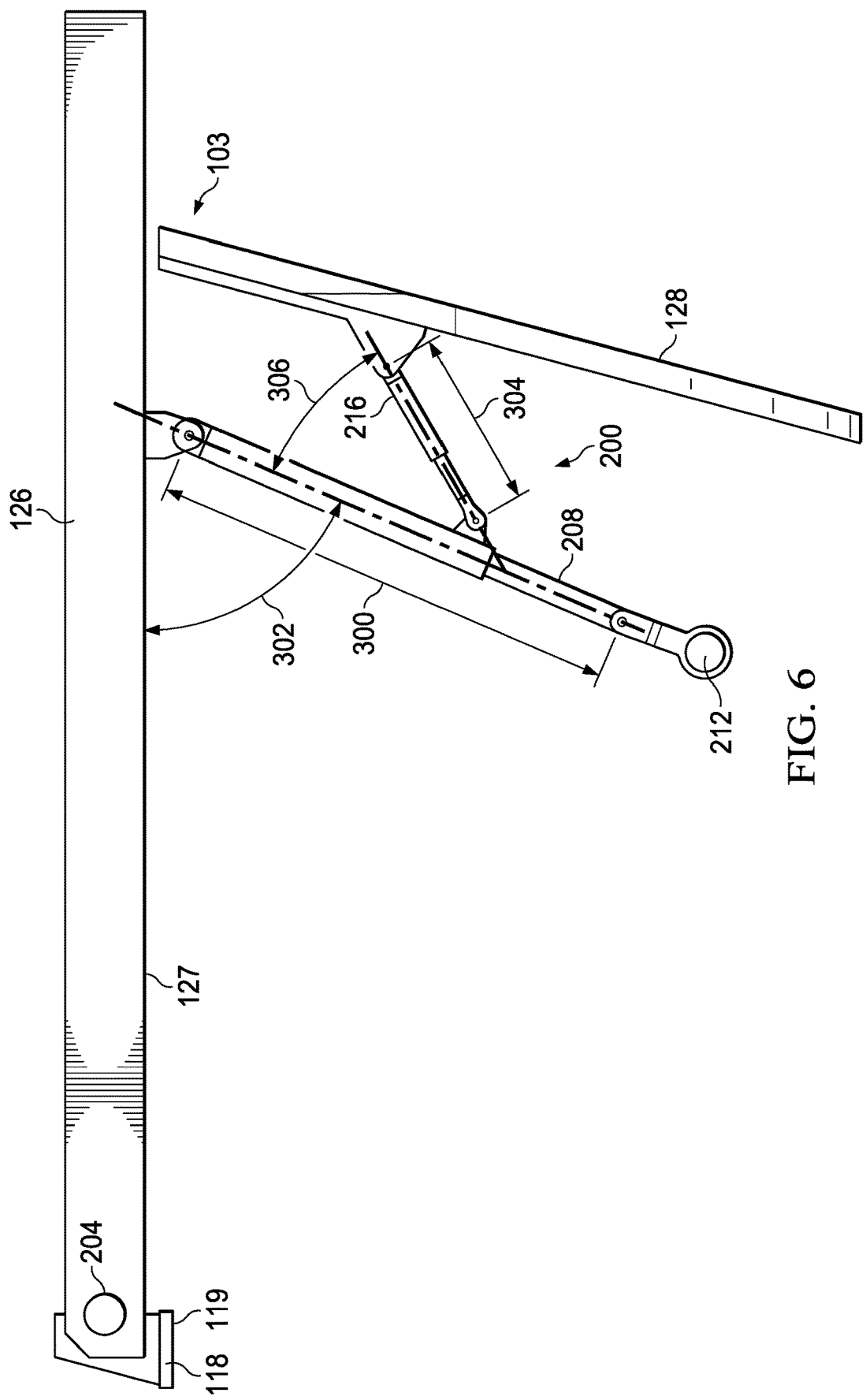
FIG. 6 is a side view of the EAS of the aircraft of FIG. 1 showing the EAS in isolation.
Figure 7:
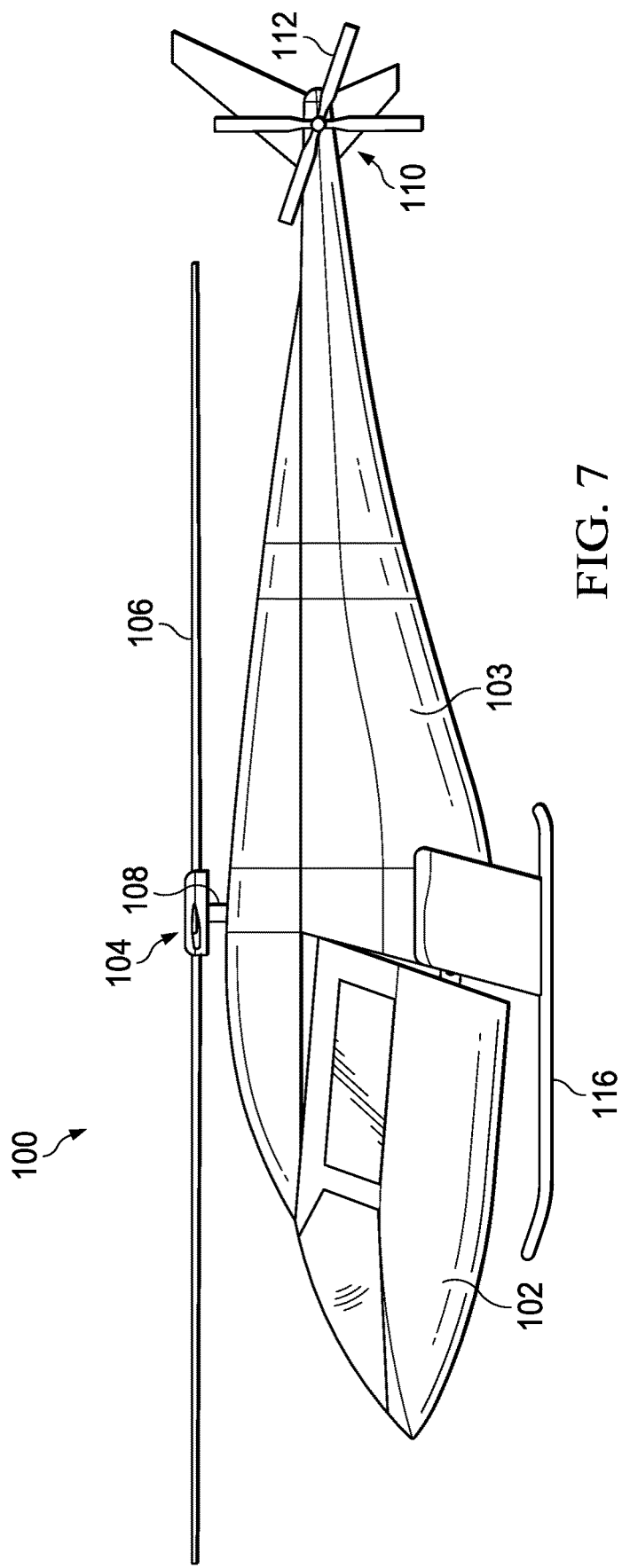
FIG. 7 is a side view of the aircraft of FIG. 1 showing the EAS in a deflected state.

Referring now to FIG. 6, EAS 200 is shown in substantial isolation and in an undeflected state representative of a desired flight state. In the undeflected or flight state, EAS 200 can be described as comprising a plurality of reference values that can define a comparative starting point for explaining differences between the flight state and the deflected state described below. With the understanding that many other methods of quantifying a change in state between the flight state and the deflected state could be utilized, some relative changes between the states are described herein. For example, in the desired flight state, a substantially platelike lower surface 119 of upper clamps 118 may be substantially parallel with a substantially platelike surface 127 of upper beams 126. Further, in the flight state, energy attenuating struts 208 may comprise an undeflected length 300 and be configured relative to surface 127 to form an undeflected primary angle 302. Similarly, stabilizing struts 216 may comprise an undeflected length 304 and be configured relative to energy attenuating struts 208 to form an undeflected secondary angle 306. In the normal and undeflected flight state, energy attenuating struts 208 provide a substantially rigid connection between pod 102 and pod carrier 103. In other words, a significant and force must be applied to energy attenuating struts 208, such as impact energy normally associated with a hard landing, to cause any deflection of pod 102 and such deflection can be accommodated by energy attenuating struts 208 compressing an internal portion of energy attenuating struts 208 to absorb or attenuate the impact energy. In some cases, energy attenuating struts 208 and/or stabilizing struts 216 can comprise elastomeric components, hydraulic components, pneumatic components, and/or any other suitable energy attenuating device. In cases where stabilizing struts 216 comprise an energy attenuating device, it will be appreciated that the primary purpose of stabilizing struts 216 is to ensure proper location of energy attenuating struts 208 and that energy attenuating characteristics of stabilizing struts 216 can be negligible as compared to the energy attenuating capability of energy attenuating struts 208.

Figure 10:
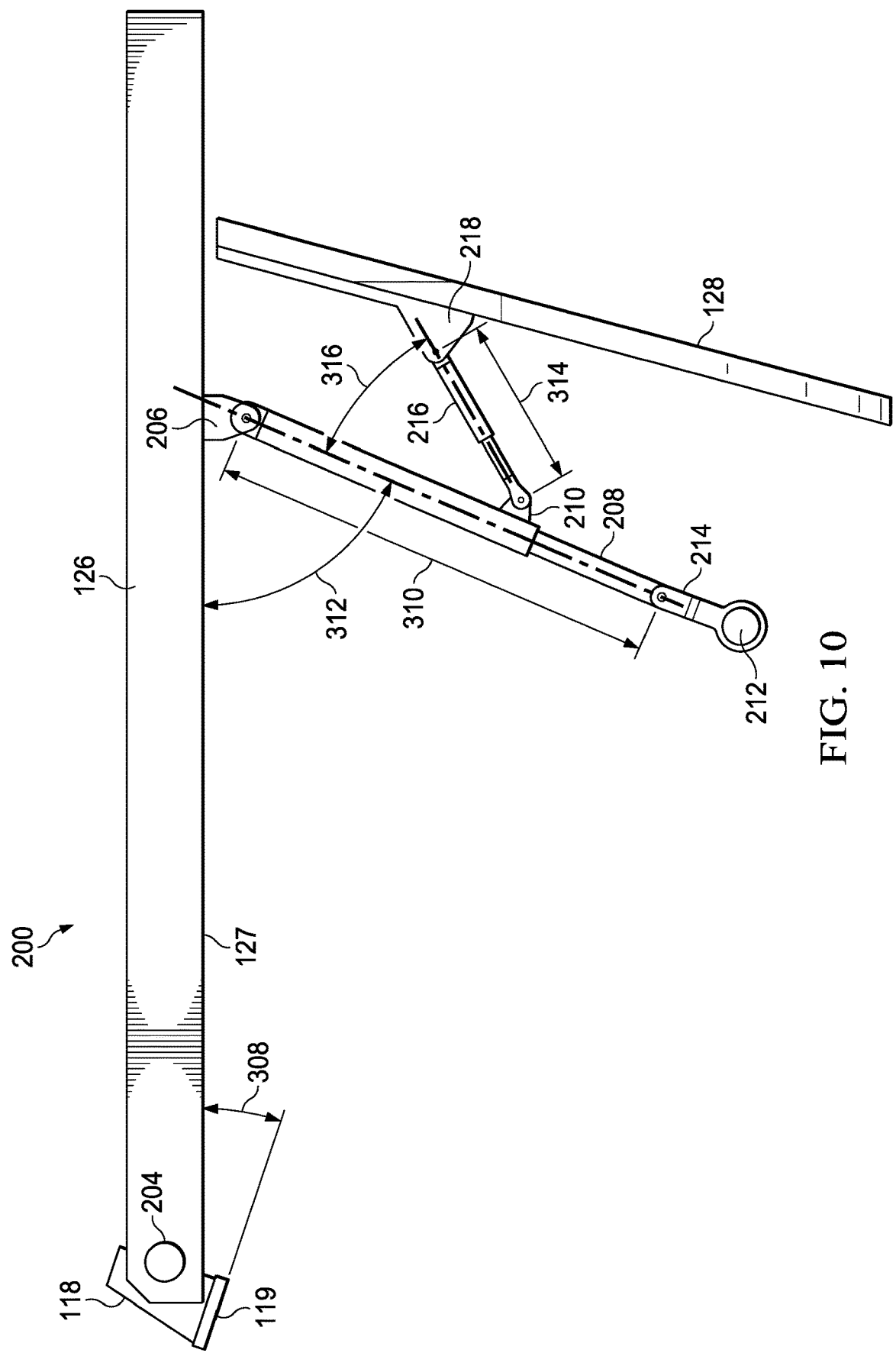
FIG. 10 is a side view of the EAS of the aircraft of FIG. 7 with the EAS in isolation and in a deflected state.

Referring now to FIGS. 7-10, aircraft 100 and EAS 200 are shown in a deflected state. In the deflected state, pod 102 is shown as moved relative to pod carrier 103. More specifically, pod 102 is shown angularly deflected about axis of rotation 205 as compared to the undeflected state. Referring more specifically to FIG. 10, EAS 200 is shown in substantial isolation and in a deflected state representative of an example hard landing state. In the deflected state, EAS 200 can be described as comprising a plurality of reference values that can be compared to the correlating values in the undeflected state. For example, in the deflected state, lower surface 119 of upper pod clamps 118 may not be substantially parallel with surface 127 of upper beams 126, but rather, conform a pod deflection angle 308 therebetween. Further, in the deflected state, energy attenuating struts 208 may comprise a deflected length 310 and undeflected length 300 and be configured relative to surface 127 to form a deflected primary angle 312 that is smaller than undeflected angle 302. Similarly, stabilizing struts 216 may comprise a deflected length 314 and undeflected length 304 and be configured relative to energy attenuating struts 208 to form a deflected secondary angle 316 that is smaller than undeflected secondary angle 306.

The description of the flight state and deflected state above makes it clear that pod 102 can be moved relative to pod carrier 103. In operation, the extension of energy attenuating struts 208 and stabilizing struts 216 serves to attenuate input forces to EAS 200 and therefore reduce impact forces transmitted to people and/or cargo carried within pod 102. In some cases, EAS 200 can be used in combination with conventional impact reduction systems such as those integrated with a seat and deflection of landing gear 116. In some cases, EAS 200 can reduce impact forces to all people and cargo aboard pod 102 before fully activating conventional impact reduction systems. Further, in some embodiments, the pod 102 can be selectively removed from the pod carrier 103 and transported by a land vehicle or any other vehicle configured for selectively interfacing with the upper clamps 118 and/or the lower clamps 120.

Figure 8:
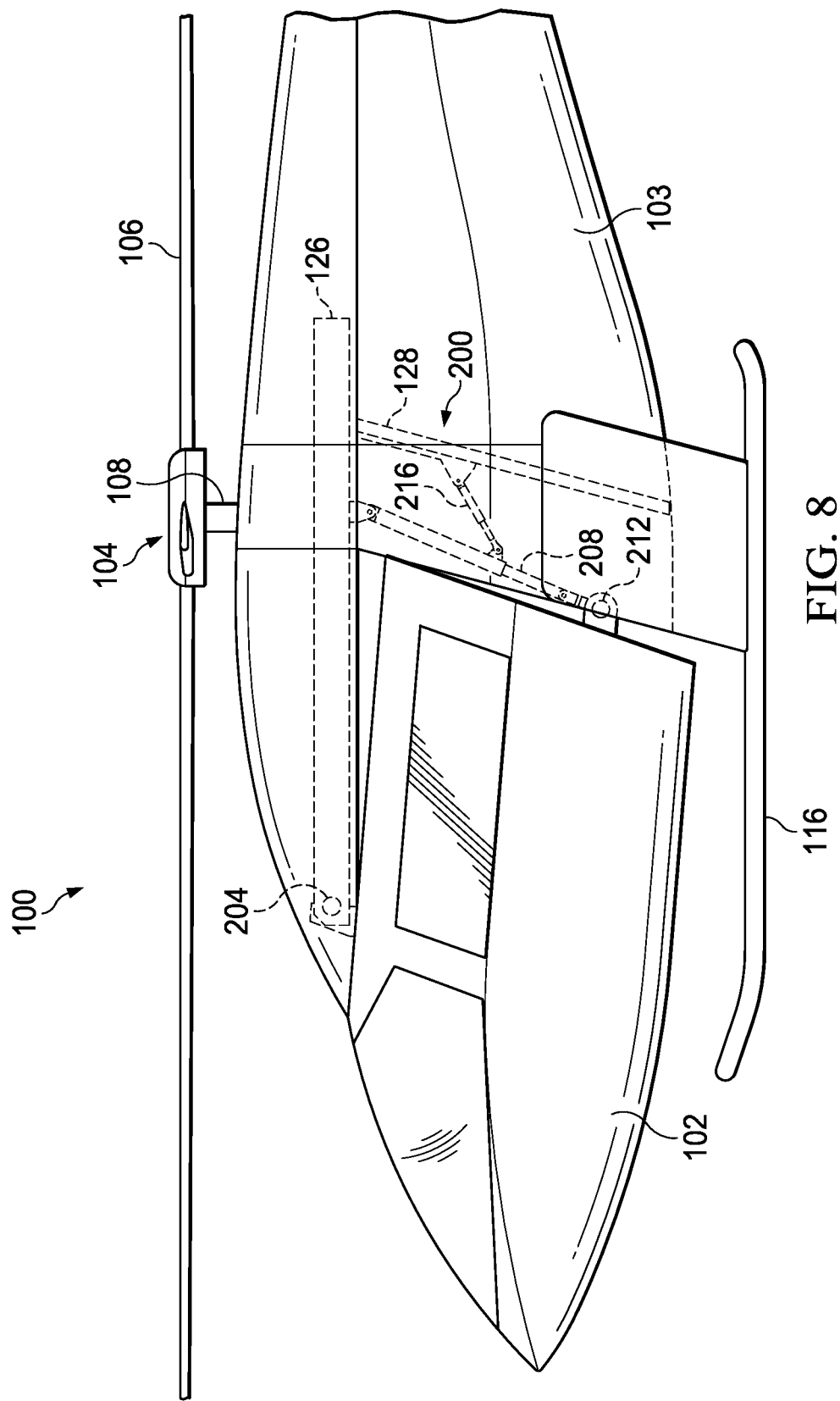
FIG. 8 is an oblique view of a portion of the aircraft of FIG. 7 showing the EAS in greater detail.
Figure 9:
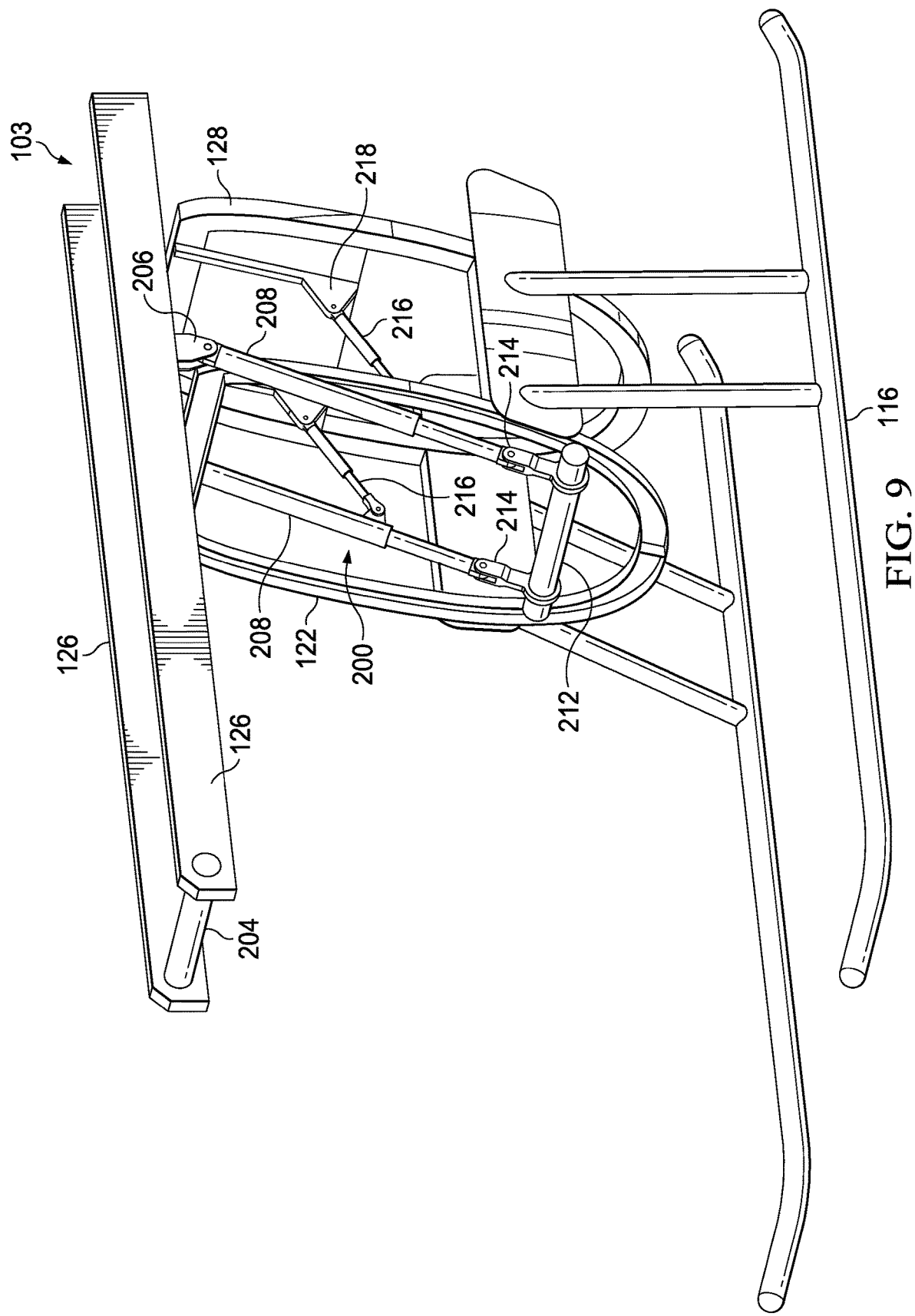
FIG. 9 is an oblique view of a portion of the aircraft of FIG. 7 showing the EAS in greater detail and substantially in isolation.
Figure 11:
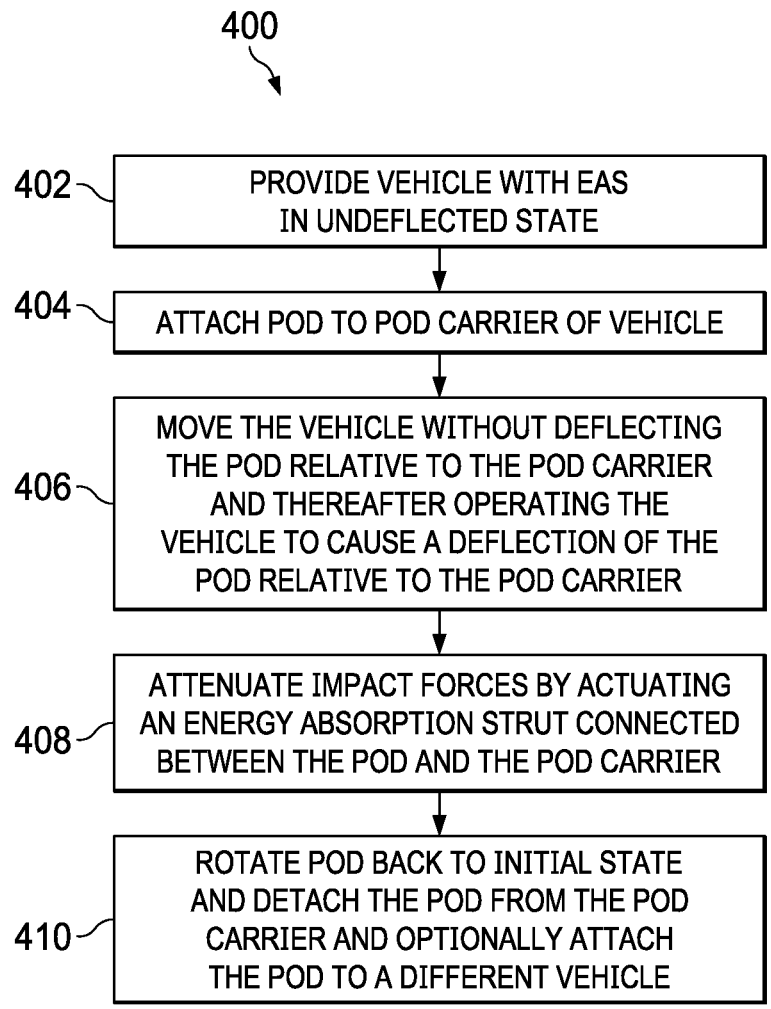
FIG. 11 is a flowchart of a method of operating an EAS according to an embodiment of this disclosure.
Figure 12:
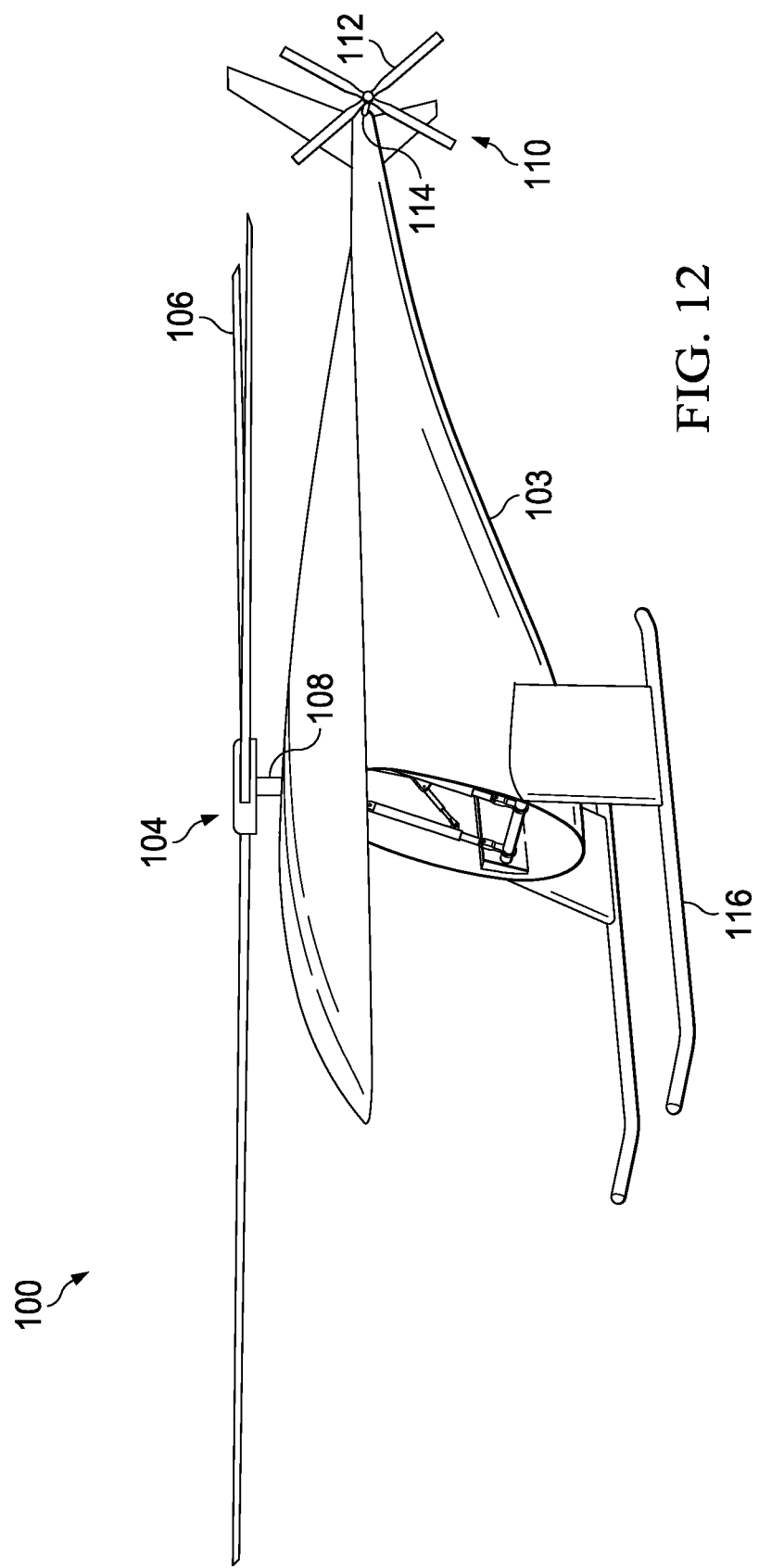
FIG. 12 is an oblique view of a vehicle having a pod carrier and an EAS all configured in an undeflected state to receive a pod.
Figure 13:
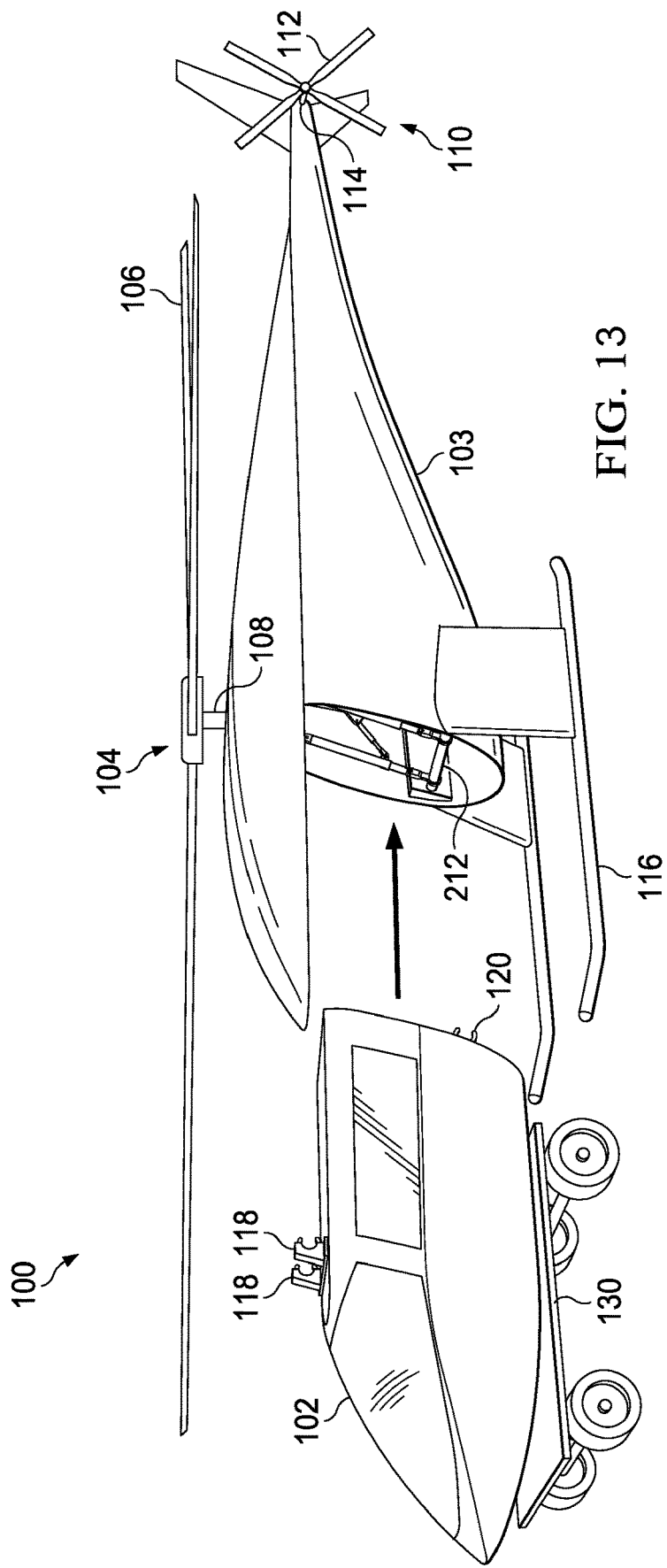
FIG. 13 is an oblique view of a pod carrier in alignment with a pod, both in a state configured to initiate attachment of the pod to the pod carrier.

Referring now to FIG. 11, a method 400 of operating an energy attenuating system such as EAS 200 is shown. At block 402, method 400 can begin by providing an aircraft or other vehicle comprising an EAS 200 in an undeflected state as shown in FIG. 12. In the undeflected state, energy attenuating struts such as energy attenuating struts 208 between a pod and a pod carrier of the aircraft. Next, method can progress at block 404 by attaching a pod such as pod 102 to a vehicle comprising an EAS such as EAS 200. In this embodiment, pod 102 can be carried by a wheeled vehicle 130 into alignment with EAS 200 so that open upper clamps 118 and open lower clamps 120 are brought increasingly closer to engagement with upper rotation bar 204 and lower rotation bar 212, respectively. Once upper rotation bar 204 is received within upper clamps 118 and lower rotation bar 212 is received within lower clamps 120, upper and lower clamps 118, 120 can be closed and either biased toward the closed position or locked in the closed position, thereby securely capturing upper and lower rotation bars 205, 212, respectively. FIG. 13 shows the relative location of pod 102 and pod carrier 103 prior to engagement of clamps 118, 120 with rotation bars 205, 212, respectively. Next, method 400 can progress at block 406 by initially operating the vehicle to move without deflecting the pod, but thereafter, operating the vehicle to cause a deflection of the pod relative to the pod carrier. Such a deflection is illustrated in FIG. 8. In some embodiment, this movement can include a substantially vertical takeoff and a subsequent hard landing of the vehicle.

Next at block 408, the method can progress by attenuating the impact forces associated with the deflection of the pod by actuating an energy attenuating struct, such as energy attenuating strut 208, to absorb at least a portion of the energy imparted by the deflection of the pod. In some cases, most or all of the energy absorption will be accomplished by actuation of the energy attenuating strut, but in alternative embodiments, a stabilizer strut such as stabilizer strut 216 can absorb some of the energy, although much less than the energy attenuating strut. In this embodiment, method 400 can conclude at block 410 by, after the initial deflection of the pod, deflecting the pod back to the undeflected state shown in FIG. 2. Once the pod is returned to the undeflected state, the pod can be removed from the vehicle and pod carrier by opening the upper and lower clamps and moving the pod away from the vehicle in a manner reverse from that which is shown in FIG. 12. This leaves the vehicle ready to accept a pod again, whether the same pod or a different pod.

It will be appreciated that while a VTOL aircraft is described and shown, as a single main rotor traditional helicopter, in alternative embodiments, an EAS substantially similar to EAS 200 can be incorporated into a ducted fan aircraft, a tiltrotor, a tiltwing, a multi-rotor, or other vertical lift aircraft configuration.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A vehicle, comprising:
   a pod carrier;
   a pod rotatably connected to the pod carrier;
   an energy attenuating system (EAS) disposed between the pod and the pod carrier to attenuate forces associated with a deflection of the pod relative to the pod carrier;
   an upper rotation bar of the pod carrier;
   an upper clamp carried by the pod and configured to selectively connect the pod to the pod carrier;
   a lower rotation bar carried by the pod carrier; and
   a lower clamp carried by the pod and configured to selectively connect the pod to the pod carrier;
   wherein the lower rotation bar is configured to selectively rotate about the upper rotation bar;
   wherein an energy attenuating strut is connected between the lower rotation bar and the pod carrier;
   wherein when the pod is rotated about the upper rotation bar from an undeflected state to a deflected state, the energy attenuating strut is lengthened; and
   wherein a stabilizing strut is connected between the energy attenuating strut and the pod carrier.

2. The vehicle of claim 1, wherein the pod is selectively removable from the pod carrier.

3. A system, comprising:
   a vertical support base configured for selectively contacting a ground surface and vertically supporting the system, the vertical support base extending along forward and aft directions;
   a first structural component carried by the vertical support base and disposed at least partially higher than the vertical support base;
   a variable length first stabilizing strut having a first end rotatably connected to the first structural component at a first height above a lowest portion of the vertical support base and extending to a second end that is both lower than the first end and forward of the first structural component;
   a variable length energy attenuating strut rotatably connected to the first stabilizing strut, the energy attenuating strut comprising a first end disposed relatively higher than the first end of the first stabilizing strut and a second end disposed relatively lower than the second end of the first stabilizing strut; and
   a beam disposed relatively higher than the first end of the first stabilizing strut and rotatably connected to the first end of the energy attenuating strut, the beam extending further forward than the location of the first end of the energy attenuating strut.

4. The system of claim 3, further comprising:
   a lower rotation bar connected to the second end of the energy attenuating strut.

5. The system of claim 4, further comprising:
   a lower clamp rotatably connected to the lower rotation bar.

6. The system of claim 5, further comprising:
   a pod connected to the lower clamp.

7. The system of claim 3, further comprising:
   an upper rotation bar connected to the beam at least partially disposed further forward than the location of the first end of the energy attenuating strut.

8. The system of claim 7, further comprising:
   an upper clamp rotatably connected to the upper rotation bar.

9. The system of claim 8, further comprising:
   a pod connected to the upper clamp.

* * * * *